United States Patent
Fogler, Jr. et al.

[11] Patent Number: 5,617,316
[45] Date of Patent: Apr. 1, 1997

[54] MAINTAINING ATTITUDE ERROR CONSTANT IN EULER SINGULARITY PROTECTION

[75] Inventors: Donald L. Fogler, Jr., Milford, Conn.; James F. Keller, Media, Pa.

[73] Assignee: Sikorsky Aircraft Corporation, Stratford, Conn.

[21] Appl. No.: 404,774

[22] Filed: Mar. 15, 1995

[51] Int. Cl.[6] .................................................. B64C 11/44
[52] U.S. Cl. ........................... 364/424.014; 244/17.13; 244/76 R; 244/181; 89/41.21
[58] Field of Search .................................. 364/434, 423; 244/17.13, 76 R, 175, 179, 181, 184; 89/41.21

[56] References Cited

U.S. PATENT DOCUMENTS

| | | | |
|---|---|---|---|
| 5,141,177 | 8/1992 | Wright et al. | 244/17.13 |
| 5,169,090 | 12/1992 | Wright et al. | 244/17.13 |
| 5,195,700 | 3/1993 | Fogler et al. | 364/434 |
| 5,213,283 | 5/1993 | Gold et al. | 244/17.13 |
| 5,222,691 | 6/1993 | Gold et al. | 244/181 |
| 5,238,203 | 8/1993 | Skonieczny et al. | 364/434 |
| 5,331,881 | 7/1994 | Fowler et al. | 89/41.21 |
| 5,446,666 | 8/1995 | Bauer | 364/434 |

*Primary Examiner*—Kevin J. Teska
*Assistant Examiner*—Tyrone V. Walker
*Attorney, Agent, or Firm*—Terrance J. Radke

[57] ABSTRACT

A model-following aircraft control system in which a roll rate command in Euler coordinates is integrated to provide a bank angle command, which has actual bank angle subtracted therefrom to provide a command error that is converted back to aircraft body coordinates for use, so long as the pitch attitude of the aircraft does not approach zenith or nadir. But, while the absolute value of the pitch attitude exceeds 85° the last error generated before exceeding 85° is converted to body coordinates for use by the aircraft, and the initial integrated value of attitude command, for use when the pitch angle reverts below 85°, is formed as the sum of said last error and the actual attitude angle of the aircraft.

4 Claims, 3 Drawing Sheets

MAINTAINING ATTITUDE ERROR CONSTANT IN EULER SINGULARITY PROTECTION

The Government has rights in this invention pursuant to a contract awarded by the Department of the Army.

TECHNICAL FIELD

This invention relates to aircraft flight control systems, and more particularly to model-following flight control systems employing Euler singularity protection.

BACKGROUND ART

In an aircraft flight control system employing model-following control laws, aircraft coordinates measured around the pitch, roll and yaw axes of the aircraft are transformed from aircraft body coordinates into inertial referenced (Euler) coordinates, processed, and re-transformed into body coordinates, as shown in U.S. Pat. No. 5,169,090. Various altitude and attitude rate signals are used in the transformation.

A typical model-following control system employs values of the cosine and tangent of the aircraft pitch attitude angle, θ. In highly maneuverable aircraft, including new generation attack helicopters, certain maneuvers, such as a symmetric loop or a split S, result in a pitch angle approaching plus 90° (toward the zenith) or minus 90° (toward the nadir). When pitch attitude, θ, approaches 90°, cos θ approaches zero and values of 1/cos(–θ) and tan θ approach infinity. Thus, the transformation is bounded. When the aircraft passes through either zenith or nadir, roll attitude and heading change by 180° instantaneously.

In the aforementioned patent, whenever the pitch axis angle approaches plus or minus degrees, the model (of each model-following attitude control channel), protects against Euler singularities by driving the model toward the sensed attitude quickly. This in turn drives the corresponding attitude error to zero, resulting in no trim signal being sent to the rotors from the automatic flight control system. Further, when the related sensed attitude is itself a singularity error (180° flipped), the result changes from an error of zero to an extremely large error essentially instantaneously, as the Euler protection is removed, upon reaching a lower pitch attitude.

DISCLOSURE OF INVENTION

Objects of the invention include provision of a model-following flight control system which maintains automatic flight control system trim during maneuvers near the zenith and the nadir, and maintaining automatic flight control system trim while avoiding Euler singularities in a model-following flight control system.

This invention is predicated partly on the fact that roll and yaw rates and errors are all quite small in Euler coordinates (referenced to the earth) whenever the aircraft is flying near the zenith or the nadir. The invention is predicated on the discovery that trim can therefore be maintained adequately by ignoring actual attitude temporarily, during flight attendant Euler singularities.

According to the present invention, when an aircraft pitch angle is near plus or minus 90°, the attitude error in a model-following flight control system employing Euler transformation is held constant, thereby maintaining trim, and the initial value of the attitude command is established as the summation of said constant error with the actual aircraft attitude, thereby providing for controlled restoration of normal operation once lower pitch angles are reached, without large, transient inputs.

According further to the invention, implementation in one embodiment is achieved as functional equivalent of a track-store which normally tracks the attitude error, but stores the attitude error present when the aircraft enters the excessive pitch attitude regime, and applies that summed with the current actual, measured attitude as a fixed preset or initial condition of the attitude command integrator. Thus, as actual attitude varies, so also does the summation with the stored, last attitude error and similarly the forced output of the attitude command integrator. Therefore, the attitude error remains constant as that which is stored in the equivalent of a track-store device.

The invention is described in terms of control logic as well as exemplary software logic flow diagrams, which represent the best mode implementation in computers.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
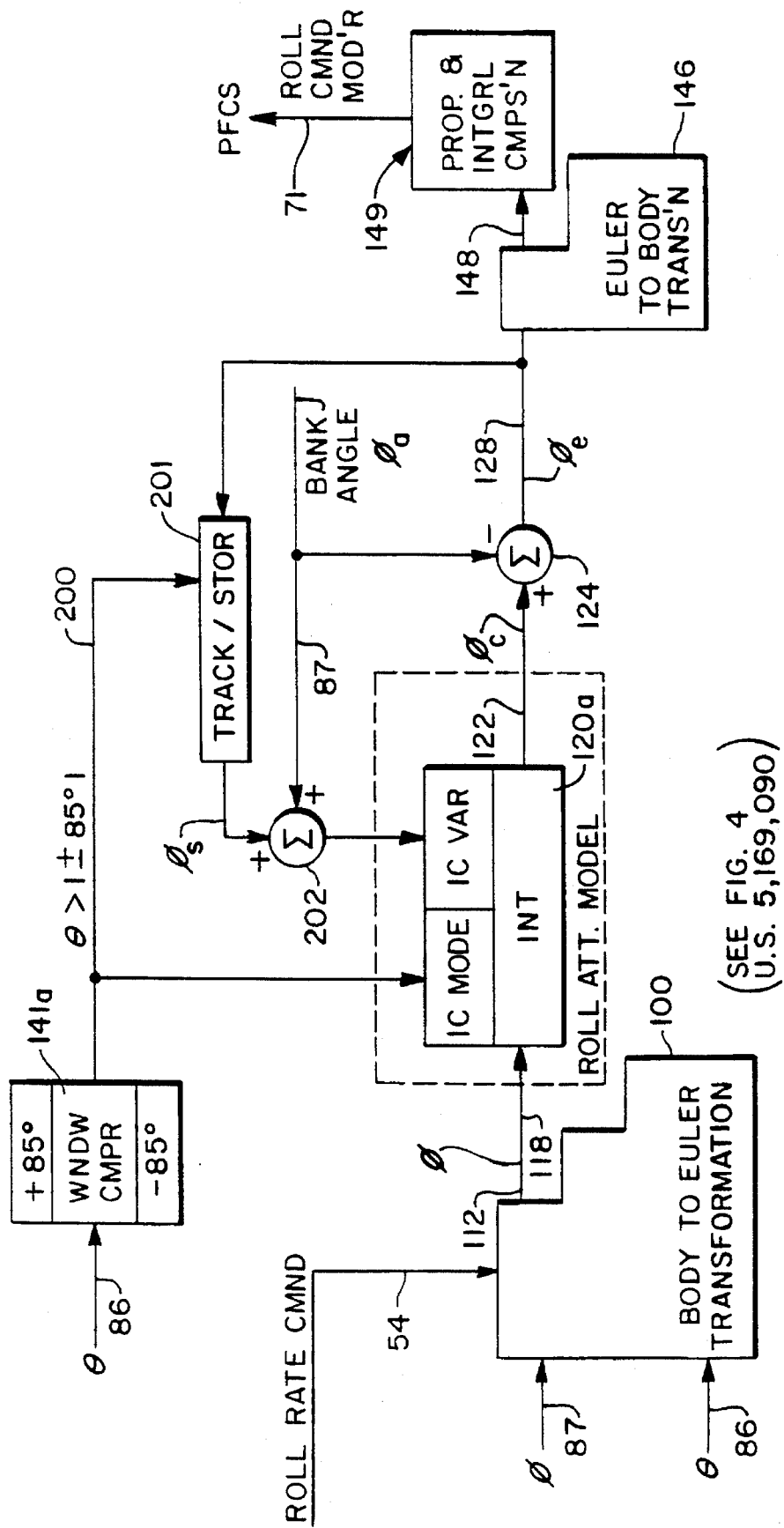
FIG. 1 is a control logic diagram of the invention.

Referring now to FIG. 1, the present invention is shown as it may be interposed between the body to Euler transformation function 100 and the Euler to body transformation function 146 of the aircraft roll axis control logic illustrated in FIG. 4 of the aforementioned U.S. Pat. No. 5,169,090, which patent is incorporated herein in its entirety by reference. The roll rate command signal on a line 54 is provided, in said patent, as a modeled function of the left-to-right force, if any, on a sidearm force stick controller used by the pilot to induce changes in aircraft attitudes. The roll rate command signal on a line 54 is transformed into a roll rate command signal, $\dot{\phi}$ on a line 112 by the body to Euler transformation function 100 in response to the bank angle (roll angle) $\phi$ on a line 87, the pitch angle, θ, on a line 86 as well as yaw rate command and pitch rate command (not shown). In normal operation, the roll rate command $\dot{\phi}$ is integrated by an integration function 120a to provide a desired bank angle or roll attitude command signal $\phi_c$, on a line 122. From this is subtracted the actual bank angle (measured roll angle), $\phi_a$, to provide a bank angle error (roll command error) signal, $\phi_e$, on a line 128. The bank angle error signal on line 128 is converted back into body coordinates by the Euler to body transformation function 146, and the converted roll angle error is provided on a line 148 to proportional and integral compensation function 149, which provides the roll command modifier signal on the line 71 to the primary flight control system (PFCS) of the aircraft. Thus far, the description is the same as operation in the aforementioned patent.

The aircraft pitch angle, θ, is provided on the line 86 to a window comparator 141a for comparison against references equivalent to +85° and −85°. Whenever the pitch angle exceeds 85°, the comparison 141a causes, as indicated by a line 200, the bank angle error $\phi_e$ to be retained in a track store function 201, the output of which, $\phi_s$, is applied for summation with the actual bank angle, $\phi_a$, in a summing function 202. The sum is utilized as the initial condition variable (the forced setting) of the integration function 120a, and therefore as the initial roll attitude command signal, $\phi_c$, whenever the integration function is in the initial condition mode in response to the excessive pitch angle indication on line 200. In this condition, the actual bank angle, $\phi_a$, is added in at the summing function 202 and subtracted out at the summing function 124 so that the output of the summing function 124 is only the stored component, $\phi_s$, which in turn is the last operational value of bank angle error $\phi_e$. Thus, the logic function illustrated in FIG. 1 causes the bank angle error, $\phi_e$, to be frozen as the aircraft enters an excessive pitch angle flight regime. Because of the manner of achieving the freezing of the bank angle error as described, this error also becomes the starting value for integration, the initial roll attitude command, once the aircraft leaves the excessive pitch angle regime. When control represented by the line 200 is no longer applicable, the integration function 120a can resume integrating the roll rate command, $\dot{\phi}$, once again. The consequence is that the primary flight control system does not lose trim during flight through an excessive pitch angle regime, and the system resumes operation with the same bank angle error that is being applied to the primary flight control system as the basis for further integration, so there is no abrupt step-function alteration in the output of the automatic flight control system when normal flight is resumed.

The invention has been described in terms of function, to illustrate its application within the system of the aforementioned U.S. patent. However, as stated in said patent, the best mode embodiment of the automatic flight control system incorporating the present invention is as a microprocessor based electronic control system in which the algorithms of the automatic flight control system logic modules described hereinbefore reside in executable program listings stored in memory.

Figure 2:
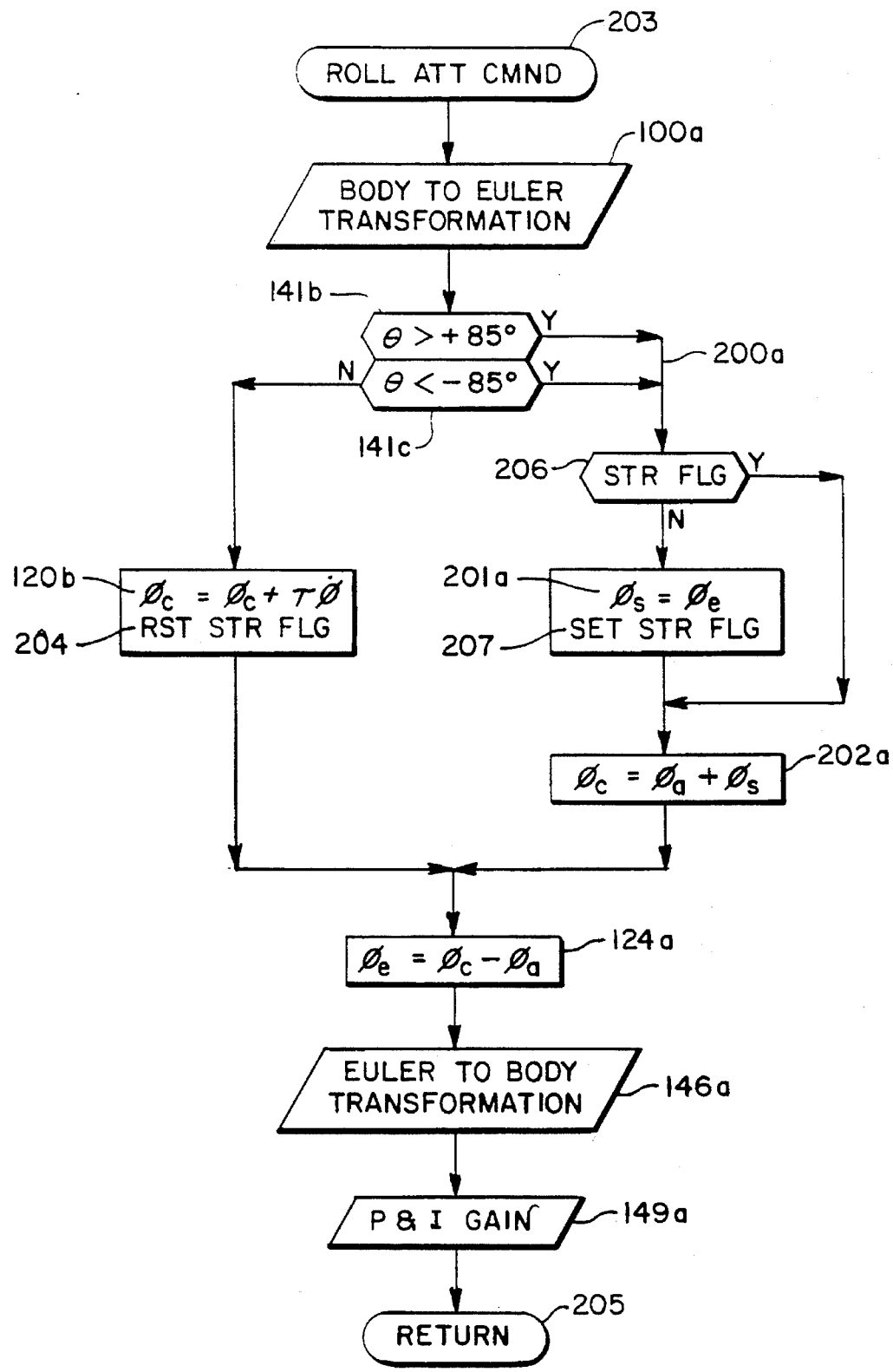
FIG. 2 is a logic flow diagram of portions of a routine for implementing the present invention in one embodiment.

Referring to FIG. 2, a logic flow diagram of an exemplary roll attitude command routine which may incorporate the invention may be reached through an entry point 203 and a first subroutine 100a performs the body to Euler transformation function. Then a test 141b determines if the pitch angle of the aircraft, θ, is greater than +85° or not. If not, a second test 141c determines if the pitch angle, θ, is less than −85°. If not, a negative result of test 141c reaches a step 120b where the integration function is performed wherein the bank angle, (roll attitude) command, $\phi_c$, has added to it some fraction (τ) of the current roll rate command in Euler coordinates, $\dot{\phi}$. A local "store" flag (described immediately hereinafter) is reset in a step 204. Then a step 124a generates the bank angle command error, $\phi_e$, as the bank angle command, $\phi_c$, minus the actual bank angle, $\phi_a$. A subroutine 146a performs the Euler to body transformation function on the value of bank angle error, $\phi_e$, as in FIG. 1. And, in an embodiment following the aforementioned U.S. patent, a subroutine 149a performs the proportional and integral gain compensation. And then, the computer may reach other programming through a return point 205.

Should the aircraft perform violent maneuvers that cause its pitch angle to approach the zenith or the nadir, one or the other of the tests 141b, 141c will be affirmative when the pitch angle exceeds plus or minus 85°. In such a case, an affirmative result of one of those tests will reach a test 206 to see if the local store flag has been set or not. Initially, it will not have been set so a negative result of test 206 reaches a step 201a in which a stored value of bank angle command error, $\phi_s$, is set equal to the current value of the bank angle command error, $\phi_e$. Then a step 207 sets the store flag, to ensure that the value of $\phi_s$ will not be changed in the next pass through the routine. A step 202a performs the initial conditioning of the integrator function 120a, that is, establishing the initial bank angle command, $\phi_c$, as the summation of the actual bank angle, $\phi_a$, and the stored bank angle error, $\phi_s$. When this happens, the step 124a removes the actual bank angle component, $\phi_a$, leaving the bank angle error, $\phi_e$, equal only to the stored value, $\phi_s$. So the Euler to body transformation is performed on a constant $\phi_e$, equal to the stored value, $\phi_s$, when in the singularity regime. Thus, trim is maintained during the violent maneuvers.

When the aircraft returns to a less precipitous pitch angle, and θ falls below 85°, negative results of both tests 141b and 141c will again reach the step 120b to cause integration to resume, utilizing as the beginning for integration the summation of the current actual bank angle, $\phi_a$, and the stored value of error, $\phi_s$, as a consequence of the step 202a. Thus, normal operation resumes with a smooth transition, integrating on the current bank angle and the error currently being provided to the primary flight control system. Then step 204 resets the store flag so that the step 201a will be reached again if the pitch angle exceeds 85°, as described hereinbefore.

Figure 3:
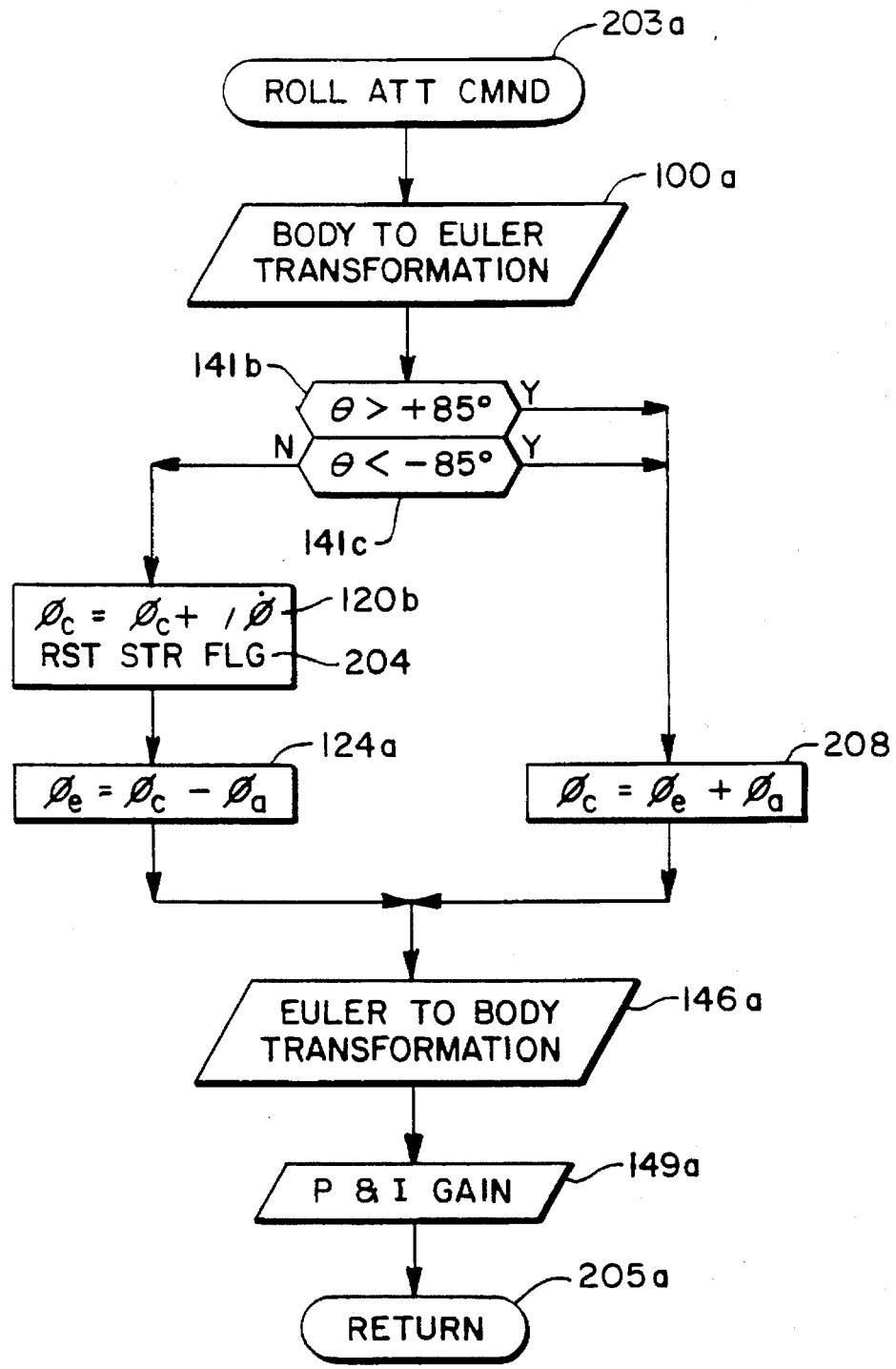
FIG. 3 is a logic flow diagram of portions of a routine for implementing the present invention in another embodiment.

The same result can be achieved as illustrated in FIG. 3 by performing the step 124a to update the bank angle error in passes through the roll attitude command routine only during non-violent maneuvers (when the pitch angle is not greater than 85°), so that the error is not updated in step 124a, but remains constant once the pitch angle exceeds 85°. This unchanging value of $\phi_e$ is transformed from Euler to body coordinates in subroutine 146a, for use in controlling the aircraft, during each pass through the routine of FIG. 3. Passes through the routine when the pitch angle exceeds 85° still convert the pilot roll rate command to Euler coordinates in subroutine 100a, but this value is not used. Instead the routine simply establishes the initial bank angle command (integration value), $\phi_c$, as the bank angle error, $\phi_e$, summed with the current actual bank angle, $\phi_a$, in the step 202a, and the constant $\phi_e$ is converted and used to control the aircraft. Of course, the logic flow diagrams of FIGS. 2 and 3 are exemplary merely of the functions, and not of detailed programming which may be utilized to implement the invention in any utilization thereof. The embodiment herein protects against Euler singularities for pitch angles in excess of 85°. This number is not critical, 80° having been disclosed in the aforesaid U.S. patent. The number can vary depending upon the apparatus with which the invention is utilized, so long as Euler singularity protection is invoked when the pitch angle is a small fraction of a quadrant from the zenith or the nadir, beyond which the body to Euler axis transformation is unusable.

The invention has been described with respect to the roll axis, as it may be implemented within the functions illustrated in FIG. 4 of the aforementioned patent. The invention can also be practiced in the yaw axis as shown in FIG. 5 of the aforementioned patent, or the pitch axis as shown in FIG. 6 of the aforementioned patent. In each case, the invention resides functionally between the body to Euler transformation and the Euler to body transformation, as shown herein.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of controlling an aircraft, which, when the absolute value of aircraft pitch attitude is less than a predetermined amount, comprises:

integrating an attitude rate command in Euler coordinates, related to a particular attitude axis of the aircraft, to provide an attitude command related to said axis, subtracting actual aircraft attitude about said axis from said attitude command to provide an attitude error, and converting said attitude error to aircraft body coordinates for use in controlling the aircraft;

and which, when the absolute value of aircraft pitch attitude exceeds said predetermined amount, comprises:

converting, to aircraft body coordinates, for use in controlling the aircraft, the last value of said altitude error generated before said pitch attitude exceeded said predetermined amount, and establishing, as the initial value of integrated attitude command to be used in integrating said attitude rate command after said pitch attitude falls below said predetermined amount, the summation of said last value of attitude error and said actual error aircraft attitude.

2. A method according to claim 1 wherein said particular attitude axis is roll.

3. Apparatus for protecting against Euler singularities in an aircraft control system in which pilot aircraft attitude rate commands about one of the attitude axes, pitch, roll or yaw, are transformed from aircraft body coordinates to Euler coordinates in response to signals indicative of attitude and attitude rate about a plurality of said attitude axes, comprising:

a plurality of angle sensors, one for each of said axes, each responsive to the aircraft attitude angle about a corresponding attitude axis of the aircraft, and each providing an actual attitude angle signal respectively indicative thereof;

a plurality of rate sensors, one for each of said axes, each responsive to the rate of change of aircraft attitude angle about a corresponding attitude axis of said aircraft, and each providing an actual attitude rate signal respectively indicative thereof;

a pilot input control responsive to a pilot rate command input about a selected one of said attitude axes for providing a selected rate command signal indicative thereof; and signal processing means responsive to selected ones of said attitude angle signals and said attitude rate signals for transforming said selected rate command signal from aircraft body coordinates to Euler coordinates and providing an Euler rate command signal indicative thereof;

characterized by the improvement comprising:

said signal processing means either, in response to said actual pitch angle signal indicating a pitch angle having an absolute value less than a predetermined magnitude, integrating said Euler rate command signal to provide an attitude command signal indicative thereof, subtracting the angle indicated by the one of said angle signals corresponding to said selected axis from the angle indicated by said attitude command signal to provide an error signal indicative of the difference therebetween, and converting said error signal to aircraft body coordinates for use in controlling said aircraft, or alternatively, in response to said actual pitch attitude signal indicating a pitch angle having an absolute value greater than said predetermined magnitude, converting to aircraft body coordinates for use in controlling said aircraft, the last error signal provided before said pitch attitude exceeded said predetermined amount, and initiating, for use as the initial value of said command signal to be integrated after said pitch attitude again falls below said predetermined value, the summation of said last error signal and said actual aircraft attitude.

4. Apparatus according to claim 3 wherein said selected one of said attitude axes is roll.

* * * * *